Figure 1:
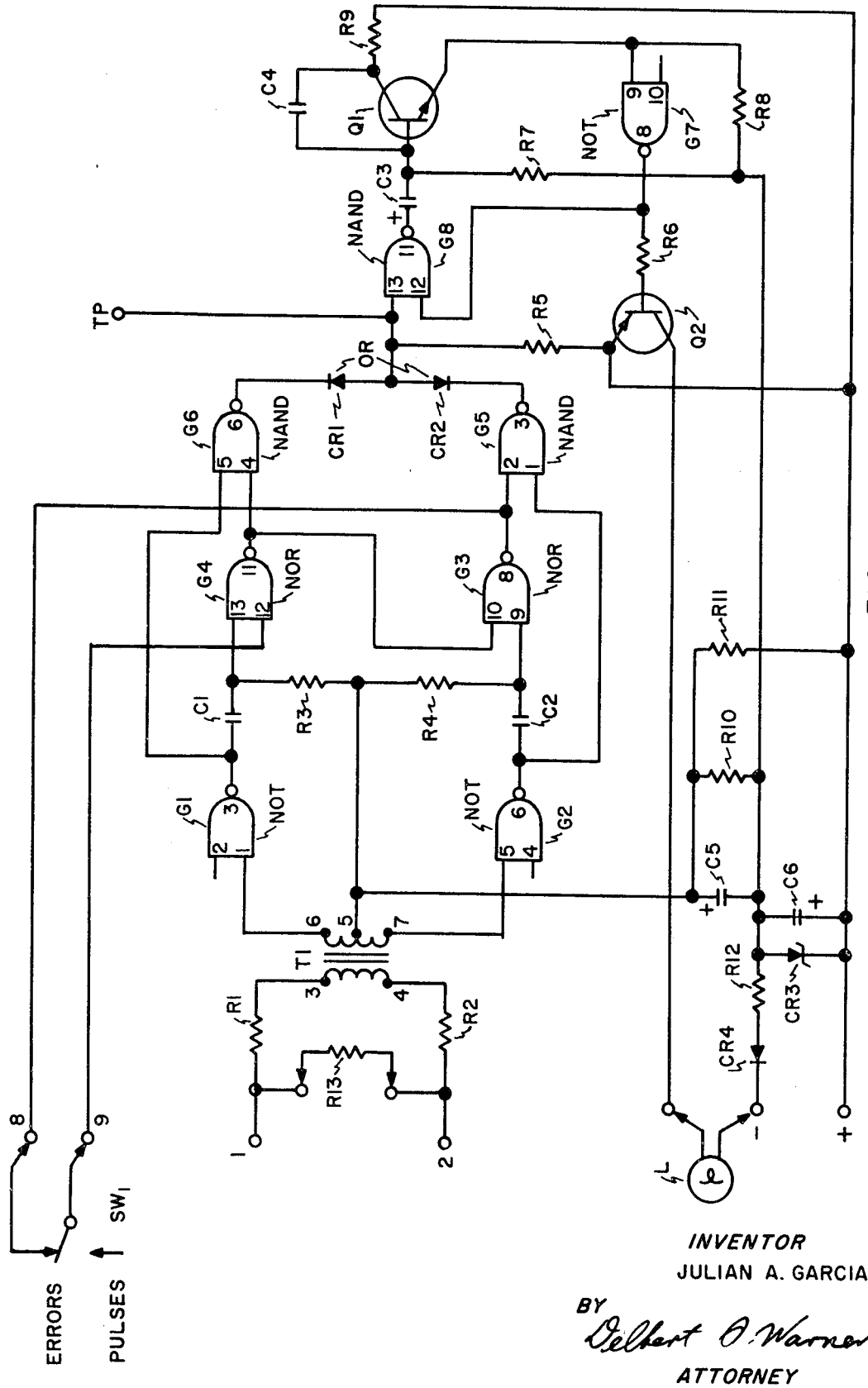

United States Patent
Garcia

[15] 3,646,453
[45] Feb. 29, 1972

[54] ERROR DETECTOR CIRCUIT
[72] Inventor: Julian A. Garcia, Raleigh, N.C.
[73] Assignee: International Telephone and Telegraph Corporation, New York, N.Y.
[22] Filed: Dec. 8, 1969
[21] Appl. No.: 882,826

[52] U.S. Cl.............................................328/118, 307/236
[51] Int. Cl............................................................H03k 5/20
[58] Field of Search...............................307/236; 328/118

[56] References Cited

UNITED STATES PATENTS

| | | | |
|---|---|---|---|
| 3,390,283 | 6/1968 | Hannigsberg | 307/236 X |
| 3,434,059 | 3/1969 | Kesolits | 328/118 X |
| 3,505,537 | 4/1970 | Giordano | 307/236 X |
| 3,518,560 | 6/1970 | Avignon | 307/236 |
| 3,553,491 | 1/1971 | Schulz | 307/236 X |

*Primary Examiner*—John S. Heyman
*Attorney*—C. Cornell Remsen, Jr., Walter J. Baum, Percy P. Lantzy, J. Warren Whitesel, Delbert P. Warner and James B. Raden

[57] ABSTRACT

An electronic detector circuit is provided for use in determining whether or not a bipolar train of pulses is being received, where a bipolar train of pulses is one in which successive pulses are of opposite polarity. The circuit also includes the capability of distinguishing errors in bipolar pulse trains where an error exists when two successive pulses are of the same polarity.

4 Claims, 3 Drawing Figures

ERROR DETECTOR CIRCUIT

The present invention relates to equipment for detecting the presence of a pulse train and, in the alternative, determining whether errors are present in a bipolar pulse train. For this purpose an error-free bipolar pulse train may be defined as one in which successive pulses are of opposite polarity and an error is indicated if two successive pulses are of the same polarity.

Pulse trains are used extensively in the transfer of information from place to place. Such pulse trains may represent information which normally appears in a digital form or may represent analog signals which have been converted to a digital form by a technique such as pulse code modulation. Regardless of the nature of the information being transmitted, there is always a possibility of error in the transmission which raises questions as to how such errors are to be detected. One well known way of preparing a pulse train so that subsequently introduced errors can be readily detected is to convert the pulses from a single polarity, which is their usual condition, to a bipolar state in which each pulse is of opposite polarity from the preceding pulse. Such an alteration of polarity may be produced by a well known technique called alternate mark inversion or A.M.T. When a pulse, in such a bipolar train of pulses, has the same polarity as the preceding one, it establishes, or defines, the presence of an error that violates the requirement for a bipolar state. Such a sameness of polarity may be said to violate a rule requiring a uniform bipolar state or a "bipolar rule."

It is a primary object of the present invention to provide improved means for detecting the presence of a bipolar pulse train.

It is a further object of the invention to provide means for determining whether a bipolar pulse train incorporates errors by checking successive pulses and indicating when successive pulses are of the same polarity and therefore include an error.

The foregoing objects and others ancillary thereto may be accomplished through the use of logic circuits to determine whether pulses are present and whether successive pulses are of opposite polarity or not. First, a train of bipolar pulses to be tested is applied across the input terminals of the primary winding of a transformer to produce two trains of pulses having opposite polarities as outputs on the end terminals of the secondary winding of the transformer. Each of the trains of pulses is fed to a circuit formed by logic components which compare the two trains and produce a warning signal if the pulses deviate from a particular sequence thus indicating that they do not form a train of true bipolar pulses. Having determined that bipolar pulses are being received, it is possible by adding connections between two logic gates to check the two trains of pulses from the transformer to determine whether errors occur, i.e., whether successive ones of the original pulses are of opposite polarity, and to produce an alarm signal if they are not.

Figure 2:
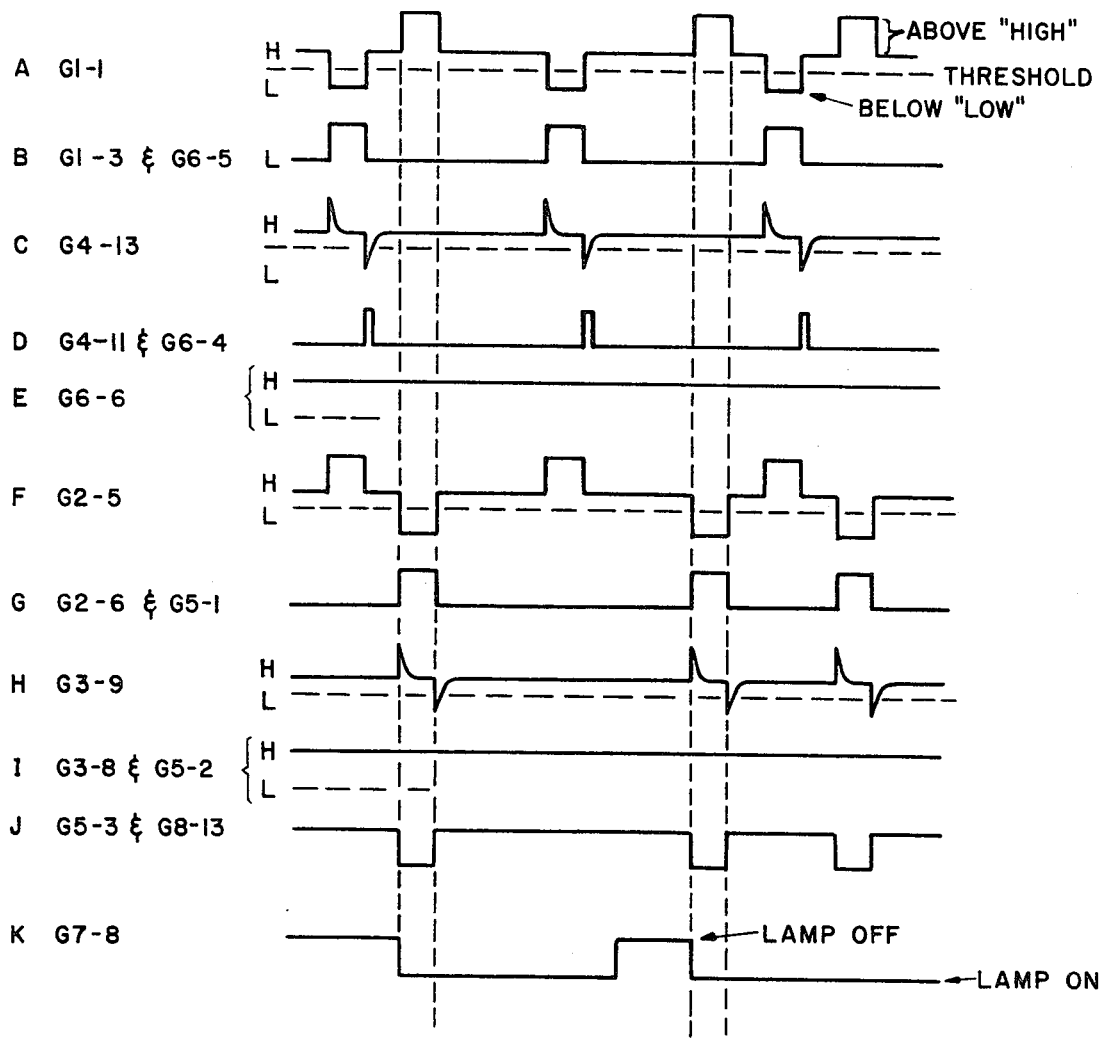
Figure 3:
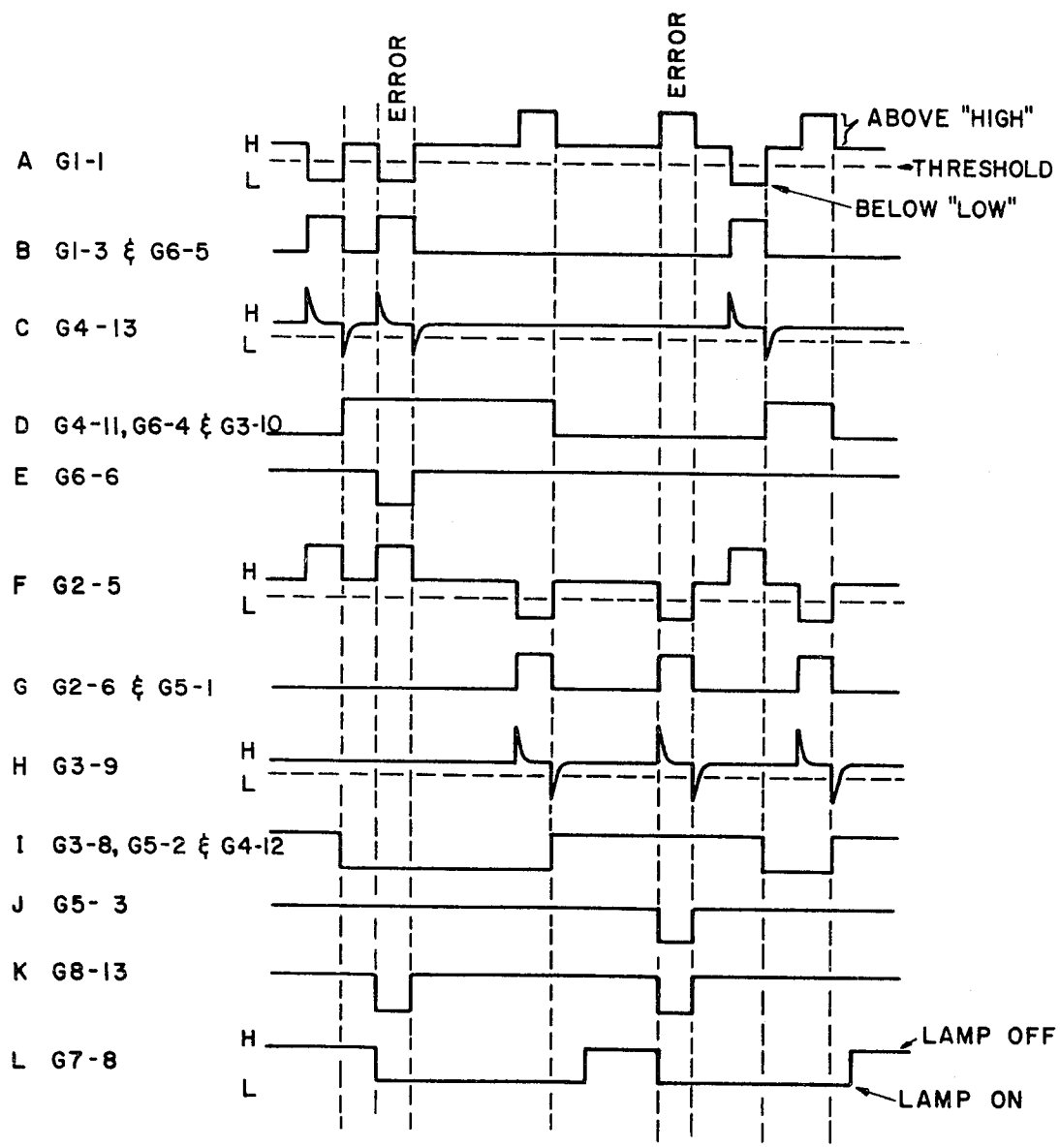

The above-mentioned and other features and objects of this invention and the manner of obtaining them will become more apparent, and the invention itself will be better understood by reference to the following description of an embodiment of the invention taken in conjunction with the accompanying drawings, in which:

FIG. 1 is a diagram illustrating the arrangement of components in accordance with a preferred embodiment of the invention, FIG. 2 is a waveform diagram of use in explaining the functioning of the diagram in FIG. 1 when the embodiment of FIG. 1 is used as a pulse detector, and FIG. 3 is a waveform diagram of use in the explanation of the invention when it is used as an error detector.

Turn now to a detailed description of the diagram in FIG. 1. It should be noted that input signals to the diagram are applied across terminals designated 1 and 2. Typically, the input signals will be alternated polarity pulses, or bipolar pulses, which are formed from PCM or pulse code modulated signals. As indicated earlier, this means that each pulse in the pulse train normally is of opposite polarity from the preceding pulse. These pulses can be used to operate a sequence of logic circuits to determine whether a pulse train is actually present or not. When a pulse has the same polarity as the preceding pulse, and error has occurred. The error detector only detects whether an error has occurred, it cannot distinguish between the omission and the insertion of pulses. Therefore, when an error is detected, the detector merely signifies that an error has occurred and leaves open the question of whether a pulse has been omitted between two pulses of the same polarity or a pulse has been added to the original pulse train.

The pulse train inserted across the terminals 1 and 2 will be of the same form as pulse trains shown in FIG. 2 on one of the lines A or F (which are also labeled G1-1 and G2-5 in reference to NOT-gates G1 and G2 and their respective terminals 1 and 5). In a typical example, the peak amplitude of the pulse will be about 3 volts. Input impedance to the system is determined by R1 and R2 in series with the input impedance of the transformer T1 appearing across the terminals 3 and 4. If a 100 ohm termination impedance, or other particular value is desired, a resistor R13 of suitable size can be connected in parallel across the terminals 1 and 2. The output signals from the secondary of the transformer T1 appear at terminals 6 and 7 and correspond respectively to the waveforms applied to inputs 1 and 5 of NOT-gates G1 and G2, as indicated in the waveform diagrams of FIG. 2 on lines A and F labeled G1-1 and G2-5. It will be noted that these waveforms are of opposite polarities befitting the fact that they were taken from the end terminals of the secondary winding of transformer T1.

The gates G1 and G2, and the gates G3, G4, G5, G6, G7 and G8 as well, will preferably be integrated circuits of Type SN 7400, quadruple, 2-input, positive NAND gates. These gates have a transition input level, which will produce a change of state in the output, lying within a range between +1.2 volts and +1.7 volts which is called the "threshold region." An input gate voltage below the threshold level (from 0 up to +1.2 volts) is referred to as Logic "0" or LOW and an input gate voltage above the threshold level (from +1.7 to +5.0 volts) is called logic "1" or HIGH.

In the circuit shown in FIG. 1, the particular gates G1 and G2 function as "NOT" gates where NOT is a Boolean logic operation indicating negation. If the input in such a NOT gate is "1" (HIGH) the output is "NOT1" but "0" (LOW). A NOT gate is actually an inverter, i.e., if the input is logic "0" (LOW) its output is logic "1" (HIGH) and vice versa. The inputs to input 1 of gate 1 are of the form shown on line A, or G1-1, in FIG. 2. The output from terminal 3 of gate 1 is of the form indicated on line B in FIG. 2, which is labeled G1-3 and G6-5 to indicate these signals appear on output terminal 3 and input terminal 5 of gates G1 and G6, respectively.

Similarly, the inputs to NOT-gate G2 are of the form shown in FIG. 2, line F. The outputs from G2 are of the form shown in FIG. 2, line G. It will be noted that the respective output signals shown on lines F and G of FIG. 2 are of opposite polarity. This polarity difference is of use in the logic circuits to which the two sets of pulses are fed.

DETECTING PULSES

The preceding discussion applies equally well to pulse train detection and to error detection. Certain changes are required from the showing in FIG. 1 if it is desired to use the circuit of FIG. 1 for pulse train detection. In order to determine whether a true pulse train is being received, or not, the switch SW1 in FIG. 1 is turned to connect terminal 9 to a dead terminal labeled "PULSES" so no signals appear on terminal 9. With no signal on terminal 9, there will be none on the input terminal 12 of a NOR gate G4. A nor gate, it will be recalled, yields a logic "1" (HIGH) output when one or more of its inputs are logic "0" (LOW). "NOR" is short for "NOT-OR." The input appearing on terminal 13 of the NOR-gate G4 originates from the output terminal 3 of NOT gate G1 (FIG. 2, line B). The output of NOT-gate G1 is differentiated by action of the circuit C1-R3 to produce the sharp pulses shown in FIG. 2, line C. The pulses of FIG. 2, line C, are applied to the input 13 of NOR-gate G4. The negative going pulses cause the NOR gate to provide narrow output pulses a terminal 11 of G4, as indicated in FIG. 2, line D. These short pulse produce no further effects.

Gate G6 is a NAND gate, i.e., a gate which delivers a logic "0" (LOW) output when all the logic input signals are logic "1" (HIGH) and a logic "1" (HIGH) when the input signals are not all "1." Consequently, since the positive or "1" pulses, at G6 terminals 4 and 5 occur at different times (see FIG. 2, lines B and D), a "1" signal is not present on both terminals 4 and 5 simultaneously, therefore the output 6 of gate G6 will remain HIGH as indicated in FIG. 2E.

Consider now the second pulse in line A of FIG. 2. This pulse, as shown in line A, is positive at the input of G1 and produces no output from G1, as shown in line B. A related pulse is negative at the input of G2 (line F), leading through successive components to the series of signals indicated in the columns below line F. Specifically, the negative or "0" input to NOT gate G2 causes a logic "1" output at terminal 6 of G2. This HIGH in also present at terminal 1 of NAND gate G5. Both of the G5 gate inputs are HIGH, as shown in fig. 2 lines G and and I, producing a LOW output, for the duration of the second pulse, at output 3 of gate G5.

The LOW output from gate G5 at terminal 3 is applied, through an "OR" gate formed by diodes CR1 and CR2, to the input terminal of the NAND gate G8 which forms a part of the indicator circuit. Operation of Gate G8 serves to start a series of electrical events in successive equipment elements which operate an indicator to show whether or not a true bipolar train of pulses is being received.

OPERATION OF THE INDICATOR

Responsive to a LOW input on terminal 13, the output 11 of gate G8 becomes a HIGH, representing a nominal 5 volts applied to capacitor C3 in series with resistor R7. The voltage across R7 decays logarithmically as C3 charges up. The voltage drop across R7 is applied to the base of transistor Q1 causing it to operate as a current gain amplifier (emitter follower) having a high input impedance which is actually connected in parallel with the resistor R7.

The moment a HIGH is present at terminal 11 of gate G8 this HIGH is applied, through Q1, to input terminal 9 of NOT gate G7. A LOW is produced on the output terminal 8 of gate G7 (FIG. 2K), which is also present on the input terminal 12 of gate G8. This LOW on the output 8 of gate G7 is held until the emitter voltage of Q1 drops "below" the gate G7 threshold region. The transistor Q1, gate G7, gate G8, capacitor C3 and resistors R7 and R8 form a monostable flip-flop having a transistory state, the period of which is controlled by C3-R7. Resistor R9 and capacitor C4 prevent parasitic oscillations from occurring in Q1.

The transistor Q2 functions as a switch to turn the pilot light L "on" during the period the gate G7 output at terminal 8 is LOW (FIG. 2K). The resistor R6 serves to limit transistor Q2 base current.

In the example shown in FIG. 2, line K, the time between pulses is sufficient so that lamp L could turn "OFF" between pulses. However, since the pilot lamp L cannot be turned "on" and "off" in the time a pulse lasts, a large number of pulses may be present during the period the lamp is turned "on" by the monostable flip-flop. The fact that the lamp is "on" at the same time the switch SW1 is in the PULSES position indicates that pulses are being received. The lamp may flicker "OFF" occasionally, if the space between pulses is long, but this does not mean there has been a loss of the pulse train.

DETECTING ERRORS

In order to determine whether two successive pulses are of the same polarity, indicating an error in a bipolar pulse train, the circuit connected as illustrated in FIG. 1 may be used. This means that, for error detection, the switch SW1 is closed on ERRORS, as shown, completing a connection between terminals 8 and 9.

FIG. 3 shows idealized wave-forms of a bipolar pulse train which includes errors. The first pulse in FIG. 3 is negative going at terminal 1 of NOT gate G1 (FIG. 1). Since this pulse is LOW, the output at terminal 3 is HIGH for the duration of this pulse. This HIGH is also present at the input terminal 5 of NAND gate G6. The output pulse on terminal 3 of gate G1 is differentiated by C1-R3, to produce positive and negative sharp pulses of the form shown in FIG. 3C. The sharp pulses are applied at the input terminal 13 of the NOR-gate G4. The positive going sharp pulse produces no change in G4. The negative going sharp pulse serves as a logical LOW to gate G4 producing a HIGH which is applied to the input terminal 4 of NAND-gate G6 and input terminal 10 of NOR-gate G3. A positive bias is supplied over resistor R4 to terminal 9 of gate G3. Both input terminals of gate G3 are therefore positively biased, causing output terminal 8 to be LOW (FIG. 3I). The LOW signal present on terminal 8 of gate G3 is applied over terminal 8 of switch SW1 to input terminal 12 of G4 and more directly to input terminal 2 of G5.

If is a function of the invention at this point to provide a memory of the latest pulse in order to prepare a basis for a comparison to determine whether the succeeding pulse is of the same polarity or not. To this end, the NOR-gates G3 and G4 are crossconnected to form a bistable flip flop which serves as the memory in order to isolate the next pulse if it has the same polarity as the preceding one. Specifically, after application of the first input pulse as shown on line A of FIG. 3 the gate G3 output 8 will remain LOW and the gate G4 output 11 will remain HIGH as long as the following pulses have the same polarity as the first one. If an error pulse (i.e., a pulse of the same polarity as the immediately preceding pulse) such as the second pulse in FIG. 3, line A, is applied to this system, the error will be isolated and a series of steps to turn a pilot alarm "on" will be followed automatically.

Consider now in detail the effects produced by the second pulse in line A of FIG. 3, which is labeled ERROR. This pulse, as shown in line A, is negative at the input of G1 and produces a positive output from G1, as shown in line B. A related pulse is positive at the input 5 of G2 (line F). A series of signals result as indicated in the columns below line B. Specifically, the negative or "0" input to NOT gate G1 causes a logic "1" output at terminal 3 of G1. This HIGH is also present at terminal 5 of NAND gate G6. Both of the G6 gate inputs are HIGH, as shown in FIG. 2 lines B and D, producing a LOW output, for the duration of the second or "error" pulse, at output 6.

The foregoing discussion relates to errors of negative polarity such as the first two pulses in FIG. 3, line A. In the even the error is of positive polarity, or HIGH as indicated by the second two pulses in line A of FIG. 3, the following sequence will occur. The third pulse on line A, FIG. 3, will cause the transformer to apply a LOW pulse as the input to terminal 5 of gate G2. The gate G2 will then provide a HIGH at its output 6, as indicated in line G of FIG. 3. This HIGH is also present at input 1 of gate G5.

The output from gate G2 terminal 6 is differentiated by C2-R4 and the fall time (end of the pulse) is supplied as a LOW at the input 9 of Gate G3, as indicated in FIG. 3, line H. Due to this LOW input, the state of the bistable flip-flop will be changed so that the output of gate G3 is now HIGH (FIG. 3, line I).

The fourth pulse in line A of FIG. 3 will produce another HIGH at gate G2 output terminal 6. This HIGH is applied as the input 1 to gate G5. Since both inputs to G5 are HIGH, the gate output 3 yields a LOW for the duration of the fourth or "error" pulse, as indicated on line 5 of FIG. 3.

This LOW from the output 3 of gate G5 represents a new isolated error which will produce identical results in the indicator circuits to those produced by a LOW on the output and NAND gate G6.

INDICATING ERRORS

A LOW output from either gate G6 (caused by an "error" of negative polarity) or gate G5 (caused by an "error" of positive polarity) will be applied, through an "OR" gate formed by diodes CR1 and CR2, to the input terminal of the NAND-gate G8 to start a series of events leading to an indication of whether an error is present in the pulse train, or not. The sequence is identical to that followed under the heading above called "OPERATION OF THE INDICATOR" though the thing being indicated is different in accordance with the difference in setting of the ERRORS-PULSES switch SW1.

The NAND-gate G8 is biased so that a negative or LOW input signal on its terminal 13 will switch its output to a HIGH. This HIGH is a nominal 5 volts which is applied to capacitor C3 in series with resistor R7. The voltage across R7 decays logarithmically as C3 charges up. The voltage drop across R7 is applied to the base of transistor Q1 causing it to operate is a current gain amplifier (emitter follower) having a high input impedance which is actually connected in parallel with the resistor R7.

The moment a HIGH is present at terminal 11 of gate G8 this HIGH is also presented, through Q1, at input terminal 9 of NOT gate 7. A LOW is produced on the output terminal 8 of gate G7 (FIG. 3L), which is also present on the input terminal 12 of gate G8. This LOW on the output 8 of gate G7 is held until the emitter voltage of Q1 drops "below" the gate G7 threshold region. The transistor Q1, gate G7, gate G8, capacitor C3 and resistors R7 and R8 form a monostable flip-flop having a transistory state, the period of which is controlled by C3-R7. Resistor R9 and capacitor C4 prevent parasitic oscillations from occurring in Q1.

The transistor Q2 functions as a switch to turn the pilot light L "on" during the period the gate G7 output at terminal 8 is LOW (FIG. 3L). The resistor R6 serves to limit transistor Q2 base current.

In the example shown in FIG. 3, line L, the time between pulses is sufficient so that lamp L could turn "OFF" between pulses. However, since the pilot lamp L cannot be turned "on" and "off" in the time a pulse lasts, a large number of pulses may be present during the period the lamp is turned "on" by the monostable flip-flop.

The fact that the lamp goes "on" indicates during the time when the switch SW1 remains in the ERRORS position that an error has been found, i.e., that two successive pulses have proven to be of the same polarity.

POWER AND BIAS SUPPLY

The resistors R10 and R11 form a voltage divider which supplies a nominal +2 volts (above the threshold region) to inputs of Gates G1, G2, G3 and G4. This bias converts gates G3 and G4 from NAND into NOR gates. The resistor R5 provides a bias to the diodes CR1-CR2, forming the OR gate, as well as to the input 13 of the NAND gate G8.

The power supply in a preferred embodiment will typically be 6.5 volts DC. The zener diode CR3 serves as a voltage regulator. The resistor R12 is a current limiter. The diode CR4 provides polarity inversion protection. Capacitors C5 and C6 serve as filters.

OPERATION OF THE INVENTION

As previously indicated, the invention was developed with two primary objectives in view. One of these is to detect whether a received pulse train is being received. The other is to determine whether a received pulse train is truely bipolar, i.e., whether successive pulses are of opposite polarity.

To attain the foregoing objective, in a preferred embodiment of the invention, received signals are placed across the input terminals of a transformer. The secondary of the transformer then supplies a signal at each of its end terminals which is a replica of the original signal. One of these replicas is of the same polarity and the other is of opposite polarity from that of the original signal received across the primary.

Each of the replica signals is applied to a logic circuit for assessment. To determine whether trains of bipolar pulses are being received, the detector is switched manually to a first state (PULSES state) which interconnects the logic circuits to provide an output capable of operating an indicator to show when a series of two or more pulses is received. If it is desired to determine whether errors are present in a received bipolar pulse train, the detector is switched manually to a second state (ERRORS state). In the ERRORS state the logic circuits are interconnected in a different way to provide an output to the indicator during times when two successive pulses are of the same polarity, thus indicating the presence of an error. If no errors are received, the indicator will not be operated.

While the principles of the invention has been described above in connection with specific apparatus and applications, it is to be understood that this description is made only by way of example and not as a limitation on the scope of the invention.

I claim:
1. An electronic detector circuit for receiving and testing pulse trains to determine whether they are bipolar pulse trains, comprising:
  means for receiving a pulse train and converting said received pulse train into two additional pulse trains of opposite polarity with respect to each other,
  logic means connected to respond to successive pulses of said two pulse trains to provide output signals of a particular character when the polarity of successive pulses alternate, and
  means responsive to the output signals to indicate when a bipolar pulse train is being received,
  said logic means comprising:
    logic elements in each of two paths,
    a first NOT gate in each path responsive to LOW input pulses to provide a HIGH output,
    a differentiator and a NOR gate coupled in each path,
    means coupling the differentiator to receive the HIGH output of the NOT gate and to provide differentiated signals to the corresponding NOR gate, and
    means coupling outputs from the NOT gate of each path and the NOR gate of each path to a NAND gate,
    whereby the NAND gate is energized when two HIGH pulses are received to provide a LOW signal, indicating the receipt of bipolar pulses.
2. A circuit as claimed in claim 1, in which the means responsive to the output signals to indicate when a bipolar pulse train is being received comprises:
  a NAND gate responsive to a LOW signal from the logic means to provide a HIGH signal, and
  means responsive to the HIGH signal to provide a potential sufficient to operate an indicator device.
3. A circuit as claimed in claim 1 in which the logic means includes:
  interconnections coupling the output of a NOR gate in a first path to the input of a NOR gate in the second path, and
  switching means for interconnecting the output of the NOR gate in the second path to the input of the NOR gate in the first path,
  said interconnections enabling the logic means to detect errors in a bipolar pulse train.
4. An electronic detector circuit for receiving and testing pulse trains to determine whether they are bipolar pulse trains, comprising:
  means for receiving a pulse train and converting said received pulse train into two additional pulse trains of opposite polarity with respect to each other,
  logical means connected to respond to successive pulses of said two pulse trains and to provide output signals of a particular character when the polarity of successive pulses alternate, and
  means responsive to the output signals to indicate when a bipolar pulse train is being received, and connections to enable error detection, in which the logic means comprises:
logic elements in each of two paths,
a NOT gate in each path responsive to LOW input pulses to provide HIGH output,
a differentiator and a NOR gate coupled in each path,
means coupling the differentiator to receive the HIGH output of the NOT gate and to provide differentiated signals to the corresponding NOR gate,
means crosscoupling the outputs of each NOR gate to the input of the other NOR gate, and
means coupling outputs from the NOT gate of each path and the NOR gate of each path to a NAND gate,
whereby the NAND gate is energized when two HIGH pulses are received to provide a LOW indicating the occurrence of an error in the pulse train.

* * * * *